United States Patent
Yang et al.

(10) Patent No.: US 7,525,622 B2
(45) Date of Patent: Apr. 28, 2009

(54) LIQUID CRYSTAL DISPLAY DEVICE AND METHOD FOR FABRICATING THE SAME

(75) Inventors: Myoung Su Yang, Gunpo-Si (KR); Jae Kyun Lee, Gunpo-Si (KR)

(73) Assignee: LG Display Co., Ltd., Seoul (KR)

( * ) Notice: Subject to any disclaimer, the term of this patent is extended or adjusted under 35 U.S.C. 154(b) by 316 days.

(21) Appl. No.: 11/475,037

(22) Filed: Jun. 27, 2006

(65) Prior Publication Data

US 2006/0290857 A1    Dec. 28, 2006

(30) Foreign Application Priority Data

Jun. 28, 2005    (KR) .................. 10-2005-0056119

(51) Int. Cl.
*G02F 1/1337* (2006.01)
(52) U.S. Cl. ..................................... 349/129
(58) Field of Classification Search ................. 349/129

See application file for complete search history.

(56) References Cited

FOREIGN PATENT DOCUMENTS

| JP | 10-039318 A | 2/1998 |
|---|---|---|
| JP | 2000-035583 A | 2/2000 |

*Primary Examiner*—Sung H Pak
(74) *Attorney, Agent, or Firm*—Birch, Stewart, Kolasch & Birch, LLP

(57) ABSTRACT

A liquid crystal display device includes a first substrate and a second substrate facing each other; a gate line and a data line crossing each other to define a pixel region on the first substrate; a thin film transistor on the first substrate and adjacent to the pixel region; a column spacer located on the second substrate; a protrusion located on the first substrate at a location corresponding to the protrusion, the protrusion having a hollow portion and a surrounding wall surrounding the hollow portion, the hollow portion being exposed at the top side of the protrusion; and a liquid crystal layer interposed between the first substrate and the second substrate.

22 Claims, 10 Drawing Sheets

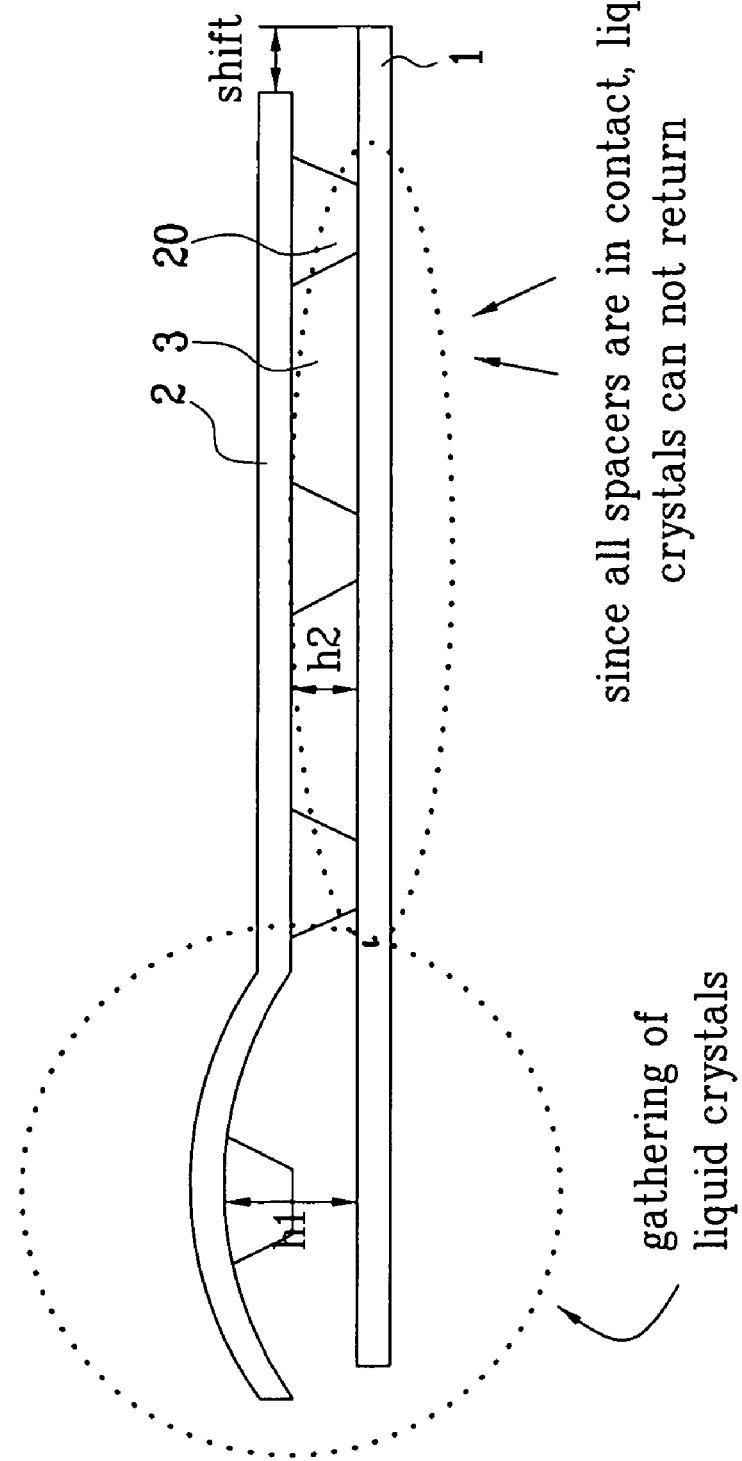

LIQUID CRYSTAL DISPLAY DEVICE AND METHOD FOR FABRICATING THE SAME

This Nonprovisional Application claims priority under 35 U.S.C. §119(a) on Patent Application No. 10-2005-0056119 filed in Korea on Jun. 28, 2005, the entire contents of which are hereby incorporated by reference.

BACKGROUND OF THE INVENTION

1. Field of the Invention

The present invention relates to a liquid crystal display device, and more particularly, to a liquid crystal display device and a method for fabricating the same to have protrusions, each of the protrusions having a closed loop-shaped cross section, to firmly support column spacers corresponding to the protrusions, thereby preventing the occurrence of display degradation.

2. Discussion of the Related Art

A demand for display devices with various features has been stronger recently. In order to satisfy the consumers' demand, various flat display devices, such as a Liquid Crystal Display (LCD), a Plasma Display Panel (PDP), an Electro Luminescent Display (ELD), and a Vacuum Fluorescent Display (VFD), have been developed, and some of those flat display devices have been widely used in various apparatuses.

Among the flat display devices, the LCD, which has several advantages, such as excellent image quality, a light weight, a thin profile, and a low power consumption, is one of the major substitute for a Cathode Ray Tube (CRT), and is used in various applications, i.e., monitors of TVs set receiving image signals and displaying the image according to the signals, monitors for desktop computers as well as mobile monitors of notebook computers.

In order to use the above LCD as a display device in various fields, it is important to display a high-quality image having a high definition, a high brightness, and a large size, while maintaining low-profile, light-weight and low-power consumption characteristics.

A general liquid crystal display device comprises a first substrate and a second substrate bonded to each other under the condition that a predetermined space is formed therebetween, and a liquid crystal display layer formed between the first and second substrates.

More specifically, in order to define pixel regions, a plurality of gate lines arranged at regular intervals in one direction and a plurality of data lines arranged at regular intervals in another direction, perpendicular to the direction of the gate lines, are formed on the first substrate. Pixel electrodes are respectively formed in the pixel regions, and TFTs for applying data signals of the data lines to the pixel electrodes according to signals applied to the gate lines are respectively formed at intersections between the gate lines and the data lines.

A black matrix layer for preventing light from leaking at portions except for the pixel regions is formed on the second substrate. R, G, and B color filter layers for expressing colors are formed at the portions corresponding to the pixel regions. Common electrodes for forming an image are formed on the color filter layer.

In the above liquid crystal display device, the liquid crystal in the liquid crystal layer formed between the first and second substrates is oriented by an electric field generated between the pixel electrodes and the common electrode, and the amount of the light transmitted by the light crystal layer is adjusted by the degree of the orientation of the liquid crystal layer. Therefore, the liquid crystal display device displays an image.

The above liquid crystal display device is referred to as a Twisted Nematic (TN) mode liquid crystal display device. The TN mode liquid crystal display device has a narrow viewing angle. In order to overcome the above drawback of the TN mode liquid crystal display device, an In-Plane Switching (IPS) mode liquid crystal display device is developed.

In the IPS mode liquid crystal display device, the pixel electrodes and the common electrodes separated from each other by a predetermined distance are formed in parallel in pixel regions of the first substrate to generate a horizontal electric field between the pixel electrodes and the common electrode, and a liquid crystal layer is oriented by the horizontal electric field.

Spacers for maintaining a predetermined interval for the liquid crystal layer between the first and second substrates of the liquid crystal display device are formed on the first or second substrate.

The spacers are divided into ball spacers and column spacers according to shape.

The ball spacers have ball shapes, and are dispersed on the first or second substrate. The ball spacers are comparatively freely movable even after the first and second substrates are bonded to each other, and have a small contact area with the first or second substrate opposite thereto.

On the other hand, the column spacers are formed during an array process performed on the first or second substrate. The column spacers have column shapes with a predetermined height and are fixed to the first or second substrate. Accordingly, the column spacers have a larger contact area with the first or second substrate opposite thereto than that of the ball spacers.

Hereinafter, with reference to the annexed drawings, a conventional liquid crystal display device having column spacers will be described.

FIG. 1 is a sectional view of the liquid crystal display device having column spacers. As shown in FIG. 1, the liquid crystal display device comprises a first substrate 30 and a second substrate 40 facing each other, column spacers 20 formed between the first and second substrates 30 and 40, and a liquid crystal layer (not shown) filled in a space between the first and second substrates 30 and 40.

A plurality of gate lines 31 and a plurality of data lines (not shown), which perpendicularly intersect each other for defining the pixel regions, the TFTs formed at the intersections between the gate lines 31 and the data lines, and the pixel electrodes (not shown) formed in the pixel regions, are disposed on the first substrate 30.

A black matrix layer 41 corresponding to the portions except for the pixel regions, a color filter layer 42 in a stripe shape corresponding to the pixel regions in the lengthwise direction parallel with the data lines, and common electrodes or an overcoat layer 43 formed on the entire surface of the second substrate 40 are disposed on the second substrate 40.

The column spacers 20 correspond to predetermined positions of the upper surface of the gate lines 31. Further, a gate insulating film 36 is formed on the entire surface of the first substrate 30 including the gate lines 31, and a passivation film 37 is formed on the gate insulating film 36.

FIGS. 2A and 2B are plane and sectional views of the liquid crystal display device having column spacers, in which a touch defect occurs. As shown in FIGS. 2A and 2B, when a liquid crystal panel 10 of the above liquid crystal display device having column spacers is touched by hand or using other objects in a predetermined direction, the touched part is stained. This referred to as a touch stain, and generates a touch defect.

It seems that the touch defect is caused by the increase of friction between the column spacers 20 and a first substrate 1 due to a large contact area therebetween, compared to the ball spacers. That is, since the column spacers 20 have a large contact area with the first substrate 1, as shown in FIG. 2B, compared to the ball spacers, it takes a longer time for the first or second substrate 1 or 2, which was shifted by the touch, to return its original state. Accordingly, the touch stain remains until the shifted first or second substrate 1 or 2 has retuned to its original state. The touch stain is well happened when liquid crystal 3 between the first substrate 1 and the second substrate 2 are insufficient.

FIG. 3 is a sectional view of the liquid crystal display device, in which a gravity defect occurs. As shown in FIG. 3, when the liquid crystal display device, is erected in a high-temperature environment, the liquid crystal 3 is thermally expanded and a cell gap is increased more than the height of the column spacers 20. Therefore, the liquid crystal 3 flows down and a gravity defect, in which the lower end of the liquid crystal display device is swollen, occurs.

The above conventional liquid crystal display device having column spacers has several problems as follows.

First, since a contact area between the column spacers and a substrate opposite thereto is large and the friction therebetween is therefore large, when the substrate is shifted by a force, it takes a longer time for the shifted substrate to return to its original state. Accordingly, a touch defect remains until the shifted substrate returns to its original state.

Second, when the liquid crystal display device is erected in a high-temperature environment, the liquid crystal is thermally expanded and a cell gap is increased more than the height of the column spacers. Therefore, the liquid crystal flows down so that the lower end of the liquid crystal display device is swollen, and becomes opaque.

SUMMARY OF THE INVENTION

One object of the present invention is to provide a liquid crystal display device, which has protrusions with a closed loop-shaped cross section, so as to firmly support the column spacers corresponding to the protrusions, thereby preventing the occurrence of display failures.

To achieve this object and other advantages and in accordance with the purpose of the invention, as embodied and broadly described herein, a liquid crystal display device includes a first substrate and a second substrate facing each other; a gate line and a data line crossing each other to define a pixel region on the first substrate; a thin film transistor on the first substrate and adjacent to the pixel region; a column spacer located on the second substrate; a protrusion located on the first substrate at a location corresponding to the column spacer, the protrusion having a hollow portion and a surrounding wall surrounding the hollow portion, the hollow portion being exposed at the top side of the protrusion; and a liquid crystal layer interposed between the first substrate and the second substrate.

In another aspect, a method of fabricating a liquid crystal display device, comprises: providing a first substrate and a second substrate; forming a gate line and a data line on the first substrate crossing each other to define a pixel region; forming a thin film transistor on the first substrate and adjacent to the pixel region; forming a column spacer located on the second substrate; forming a protrusion on the first substrate at a location corresponding to the column spacer by forming a surrounding wall surrounding a hollow portion and exposing the hollow portion at the top side of the protrusion; forming a liquid crystal layer between the first substrate and the second substrate; and bonding the first substrate and the second substrate to face each other.

In another aspect, a spacer structure of a display device is provided. The display device having a first substrate and a second substrate facing each other, the spacer structure comprising: a protrusion located on the first substrate, the protrusion having a hollow portion and a surrounding wall surrounding the hollow portion, the hollow portion being exposed at the top side of the protrusion; and a column spacer located on the second substrate and corresponding to the protrusion.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 2A and 2B are plane and sectional views the liquid crystal display device having column spacers, in which a touch defect occurs;

DETAILED DESCRIPTION OF THE ILLUSTRATED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
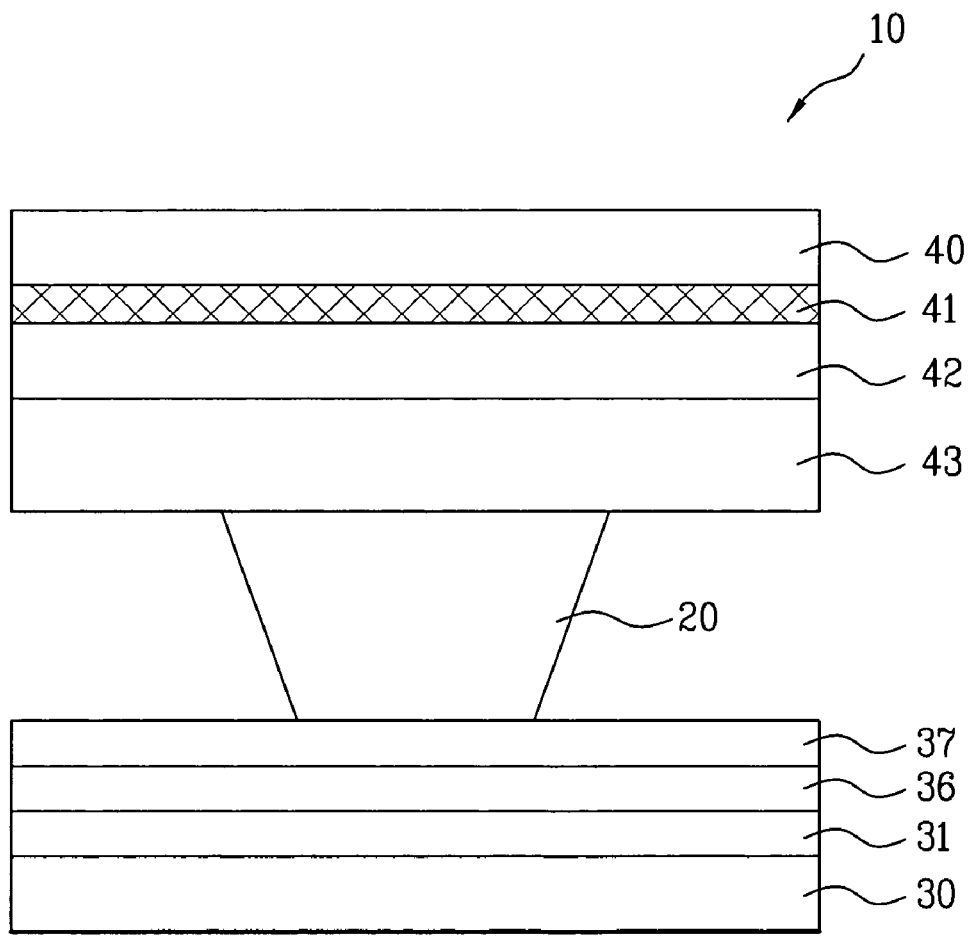
FIG. 1 is a sectional view of a liquid crystal display device having column spacers.
Figure 2A:
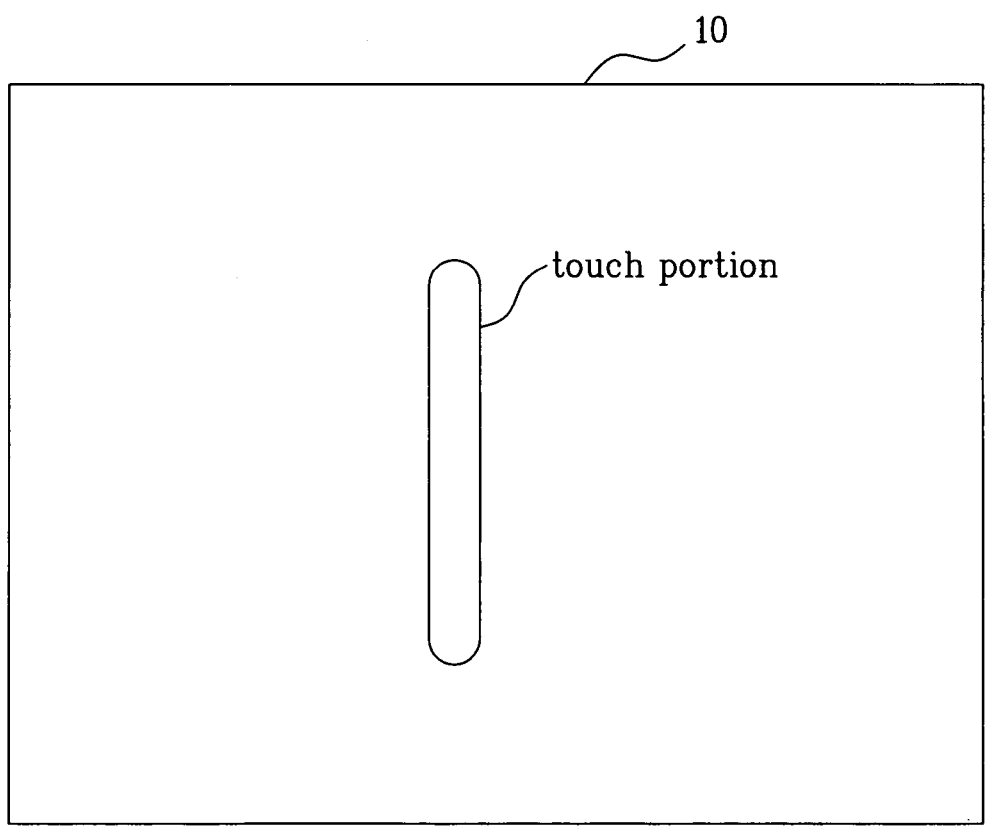
Figure 3:
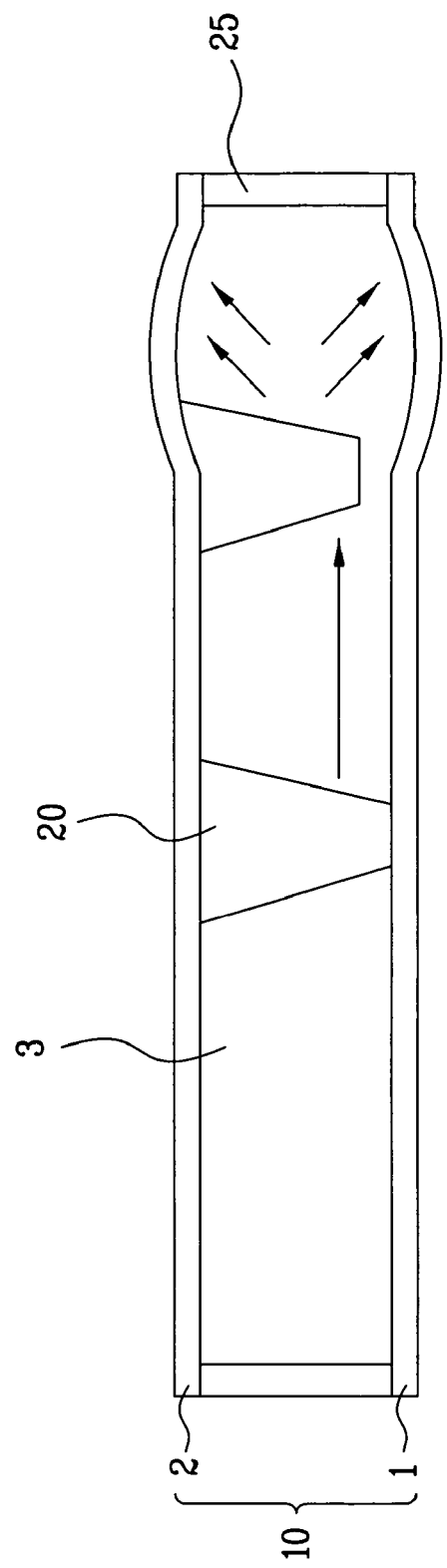
FIG. 3 is a sectional view of the liquid crystal display device, in which a gravity defect occurs.
Figure 4:
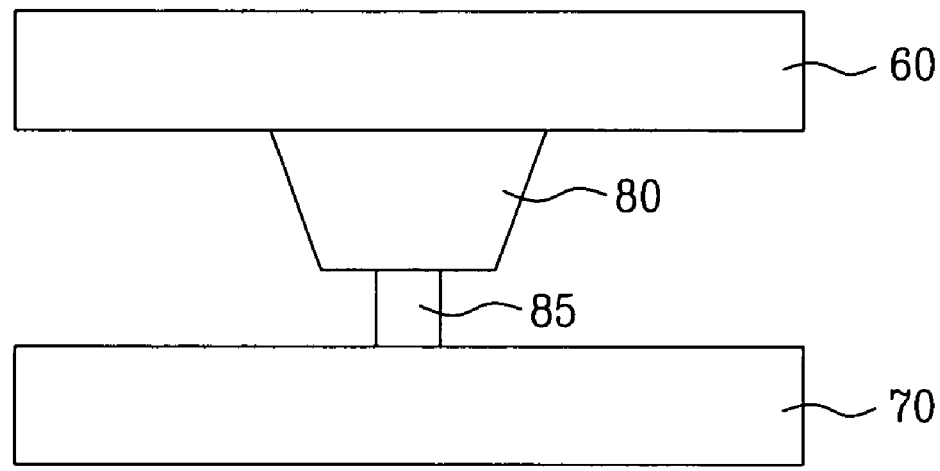
FIG. 4 is a sectional view illustrating a protrusion and a column spacer of a liquid crystal display device in accordance with an embodiment of the present invention.
Figure 5:
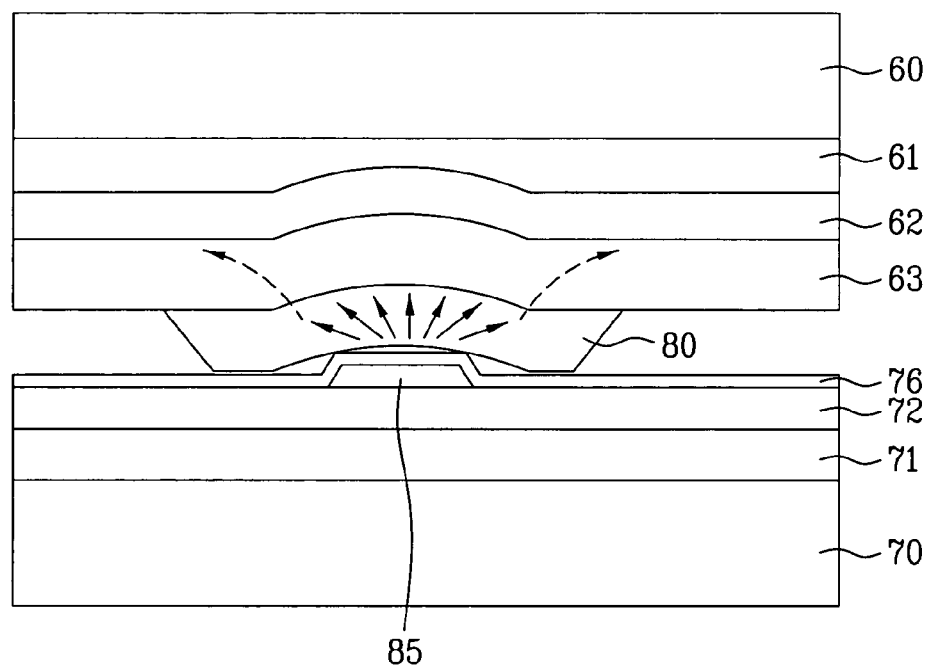
FIG. 5 is a sectional view illustrating the change of the shape of the column spacer corresponding to the protrusion, when the substrates are bonded to each other, in the liquid crystal display device of FIG. 4.

FIG. 4 is a sectional view illustrating a protrusion and a column spacer of a liquid crystal display device in accordance with an embodiment of the present invention, and FIG. 5 is a sectional view illustrating the change of the shape of the column spacer corresponding to the protrusion, when substrates are bonded to each other, in the liquid crystal display device of FIG. 4.

As shown in FIG. 4, the liquid crystal display device comprises a first substrate 60 and a second substrate 70, which face each other, column spacers 80 formed at predetermined positions on the first substrate 60, protrusions 85 having a smaller volume and a smaller surface than the column spacers 80 and formed on the second substrate 70 to contact a partial surface of the column spacers 80, and a liquid crystal layer (not shown) filled in a space between the first and second substrates 60 and 70.

In case that the liquid crystal display device has the protrusions 85, when the surface of the first or second substrate 60 or 70 is touched (rubbed or wiped in one direction) so that the first or second substrate 60 or 70 is shifted against the other substrate 70 or 60, a contact area between the column spacer 80 and the protrusion 85 is the area of the upper surface of the protrusion 85, which is smaller than the area of the upper surface of the column spacer 80 (here, the surface of the column spacer 80 facing the surface of the first substrate 60 is referred to as the "lower surface"). Therefore, the friction between the column spacers 80 and the second substrate 70 is reduced due to the decrease of the frictional area between the column spacers 80 and the protrusions 85. Accordingly, when the first or second substrate 60 or 70 is shifted in one direction by touch, the shifted substrate 60 or 70 can easily return to its original state.

As shown in FIG. 5, a color filter array comprising a black matrix layer 61, a color filter layer 62, and an overcoat layer 63 is formed on the first substrate 60. The column spacers 80 are formed at predetermined positions of the overcoat layer 63.

Gate lines 71 and data lines (not shown), cross each other to define unit pixel regions. A gate insulating film 72 is formed on the entire surface 70 including the gate lines 71. The protrusions 85 are formed on the second substrate 70. In particular, the protrusions 85 are formed on the gate lines 71 at a location corresponding to the column spacer 80. Although not shown in the drawings, the pixel electrodes are formed in the pixel regions and the TFTs are formed at adjacent a crossing of the gate and data lines. In addition, a passivation film 76 is formed on the protrusion 85.

Now, the change of the shape of the column spacer 80 corresponding to the protrusion 85 when the first and second substrates 60 and 70 are bonded to each other will be described as follows.

As shown by arrows of FIG. 5, a force is concentrated on a portion of the column spacer 80 corresponding to the protrusion 85, and thus presses the column spacer 80, the overcoat layer 63, the color filter layer 62, and the black matrix layer 61, which are formed under the column spacer 80. In case that a single or plural layers formed under the column spacer 80 is/are pressed, when a liquid crystal panel is in a high-temperature environment, a cell gap is increased due to thermal expansion of the liquid crystal. Then, the column spacer 80 and the layers under the column spacer 80 can return to their original states to due the elastically restoring force of the column spacer 80, and stably support the first and second substrates 60 and 70. Accordingly, compared to a liquid crystal display device without protrusions, the illustrated liquid crystal display device prevents the occurrence of a gravity defect due to the flowing down of the liquid crystal.

In the illustrated liquid crystal display device as shown in FIG. 5, which uses the protrusions 85 having smaller volume and surface than the column spacers 80, when the column spacers 80 and the layers under the column spacers 80 are selectively pressed by the protrusions 85, the portions of the column spacers 80 and the layers under the column spacers 80 that are not pressed by the protrusions 85 are pushed out in the direction of the dotted arrows as shown in FIG. 5. The pushed out portions of the column spacers and the layers under the column spacers 80 do not contact the second substrate 70, and are separated from the second substrate 70 by a predetermined interval. Therefore, the pushed out portions of the column spacers and the layers under the column spacers 80 may not be able to return to their original states after deformation.

Hereinafter, with reference to FIGS. 6A and 6B, a liquid crystal display device having protrusions for preventing the occurrence of a gravity defect and a touch defect and also preventing plastic deformation of the column spacers and layers under the column spacer will be described as follows.

Figure 6A:
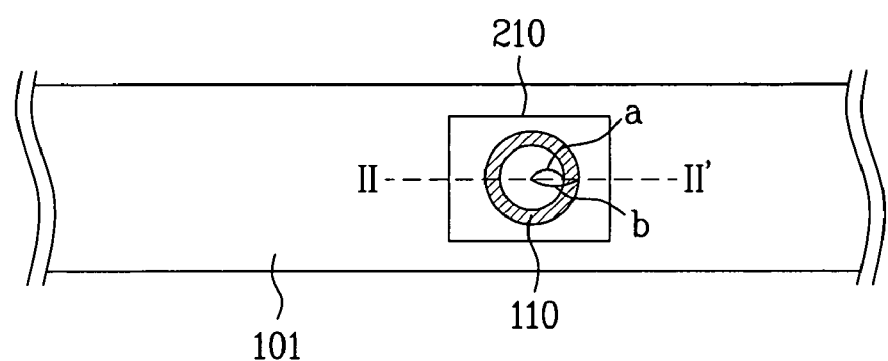
FIG. 6A is a plan view illustrating a column spacer and a protrusion corresponding a gate line, in a liquid crystal display device in accordance with another embodiment of the present invention.
Figure 6B:
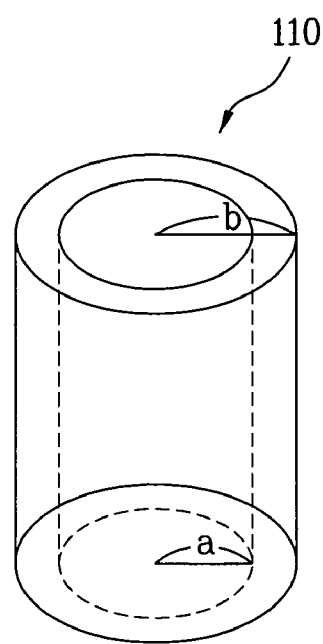
FIG. 6B is a perspective view of the protrusion of FIG. 6A.

FIG. 6A is a plan view illustrating a column spacer and a protrusion corresponding a gate line in the liquid crystal display device, and FIG. 6B is a perspective view of the protrusion of FIG. 6A. As shown in FIG. 6A, the liquid crystal display device comprises column spacers 210 formed on a second substrate 200 at a location corresponding to the gate lines 101, and protrusions 110 having a closed loop-shaped horizontal cross section and formed on a first substrate 100 at positions corresponding to the column spacers 210. As shown in FIG. 6B, each of the protrusions 110 has a hollow cylindrical structure, which has a predetermined external radius (b) and an internal radius (a) smaller than the external radius (b). In other words, the protrusions 110 has a hollow portion 110 and a surrounding wall surrounding the hollow portion, and the hollow portion is exposed at the top side of the protrusion 110 facing the column spacer 210.

In this embodiment, each of the protrusions 110 of the liquid crystal display device has a closed loop-shaped cross section. When the first and second substrates 100 and 200 are bonded to each other, the closed loop-shaped upper surfaces of the protrusions 110 contact the corresponding column spacers 210.

In this embodiment, the upper surfaces of the protrusions 110 are smaller than the upper surfaces of the column spacers 210 (here, the surfaces of the column spacers 210 facing the substrate 200 are referred to as "lower surfaces") and have a ring shape. However, the upper surfaces of the protrusions 110 may have different shapes including a closed circular loop shape and a closed polygonal loop shape, such as a closed rectangular loop shape or closed triangular loop shape. Further, the upper surfaces of the column spacers 210 are not limited to a rectangular shape, as shown in FIGS. 6A and 6B, but may have different shapes such as circular, triangular or other polygonal shapes.

Hereinafter, liquid crystal display devices in accordance with embodiments according to shapes of protrusions will be described.

Figure 7:
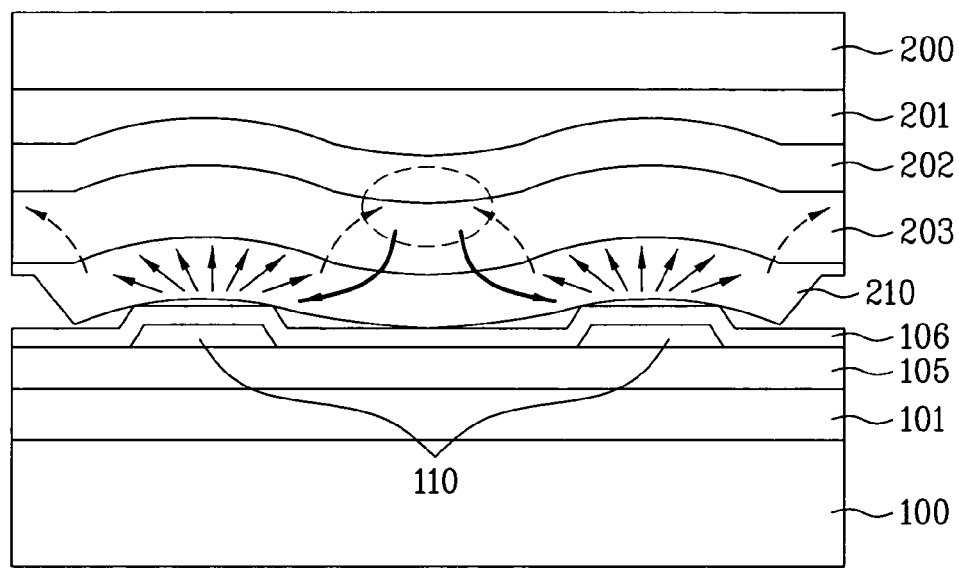
FIG. 7 is a sectional view of a liquid crystal display device in accordance with a first embodiment of the present invention, taken along the line II-II' of FIG. 6A passing through a column spacer and a protrusion.
Figure 9:
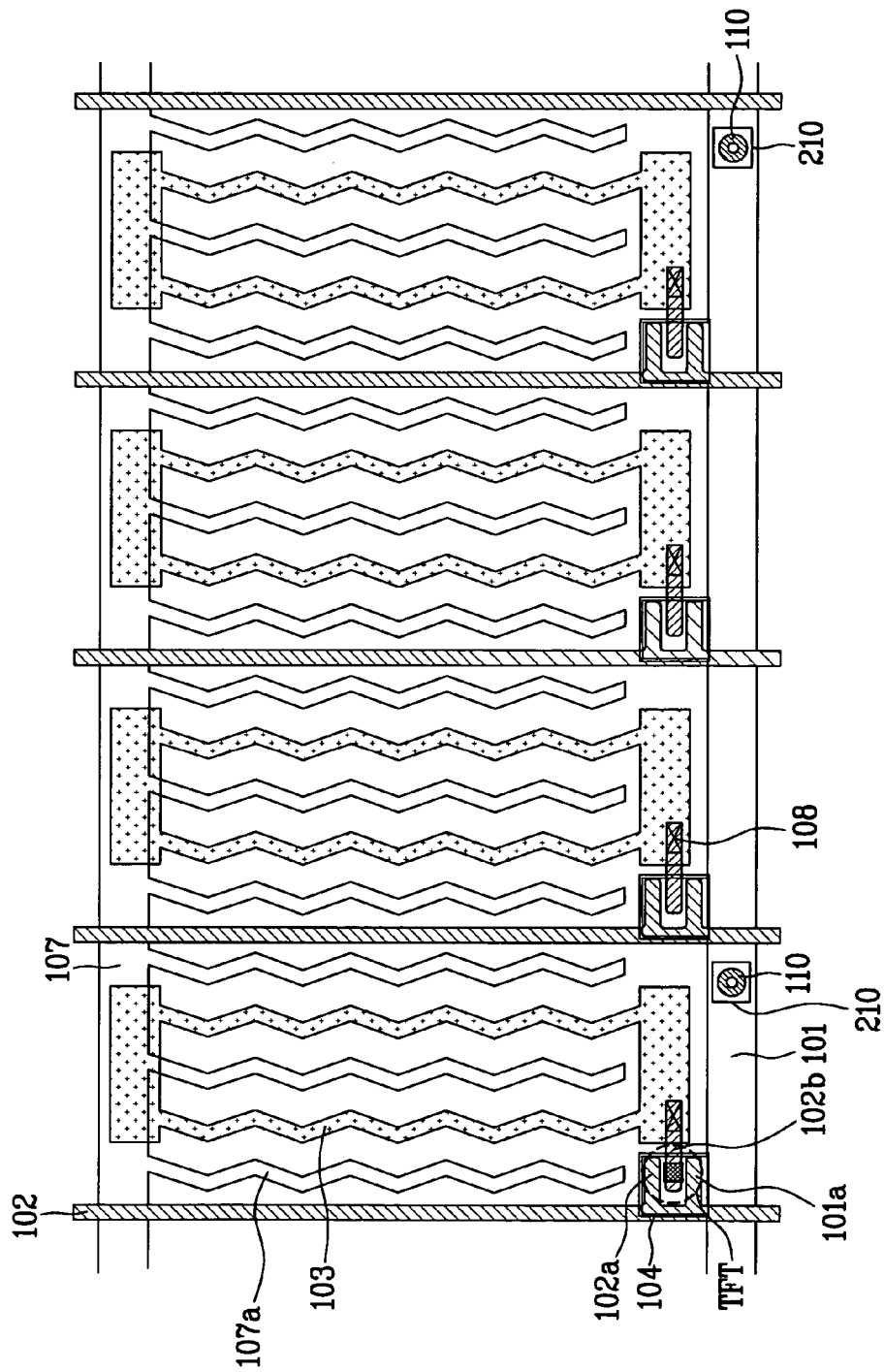
FIG. 9 is a plane view of the liquid crystal display device in accordance with an embodiment of the present invention.

FIG. 7 is a sectional view of a liquid crystal display device in accordance with a first embodiment, taken along the line II-II' of FIG. 6A passing through a column spacer and a protrusion, and FIG. 9 is a plane view of the illustrated liquid crystal display device. As shown in FIG. 7, the liquid crystal display device of the first embodiment has the protrusions 110 made of a single layer, such as a semiconductor layer or a source/drain electrode layer.

The liquid crystal display device of the first embodiment, as shown in FIGS. 7 and 9, comprises a first substrate 100 and a second substrate 200 facing each other, the protrusions 110 and the column spacers 210. Each protrusion has a closed loop-shaped cross section, formed on the first substrate 100. The column spacers 210 are formed on the second substrate 210 at a location corresponding to the protrusions 110.

More specifically, the first substrate 100 comprises gate lines 101 including gate electrodes 101a and being arranged in a first direction on the first substrate 100, a gate insulating film 105 formed on the entire surface of the first substrate 100 including the gate lines 101, a semiconductor layer 104 formed on the gate insulating film 105 for surrounding the gate electrodes 101a in an island shape, data lines 102 on the gate insulating film 105 and including source electrodes 102 protruding therefrom and arranged in a second direction perpendicular to the first direction of the gate lines 101, a passivation film 106 formed on the entire surface of the first substrate 100 including the data lines 102, and pixel electrodes 103 and common electrodes 107a alternately arranged in pixel regions on the passivation film 106. Here, the common electrodes 107a extend from the common lines 107, which are formed adjacent to the gate lines 101 in parallel with the gate lines 101.

Each of the TFTs comprises the gate electrode 101a protruding from the gate line 101, the source electrode 102a protruding from the data line 102 and having a U-shaped pattern, a drain electrode 102b partially inserted into the source electrode 102a having the U-shaped pattern under the condition that the source and drain electrodes 102a and 102b are separated from each other, and the semiconductor layer 104 formed on the gate electrode 101a and partially contacting the lower surfaces of the source/drain electrodes 102a and 102b. Here, the semiconductor layer 104 is formed by stacking a lower amorphous silicon layer and an upper impurity layer. The impurity layer is removed from the portion of the semiconductor layer 104 corresponding to a region between the source electrode 102a and the drain electrode 102b.

The liquid crystal display device of the first embodiment comprises the protrusions 110. Each protrusion 110 has a closed loop-shaped horizontal cross section, and is formed at predetermined portions of the gate lines 101. In this embodiment, the protrusions 110 are made of a single layer, such as a semiconductor layer pattern or a source/drain electrode layer. The semiconductor layer pattern is made of the same material as the semiconductor layer 104 of the TFTs (formed by stacking a lower amorphous silicon layer and an upper impurity layer) during a process for patterning the semiconductor layer 104. The source/drain electrode layer is made of the same metal of the data lines 102 and the source/drain electrodes 102a and 102b during a process for patterning the data lines 102 and the source/drain electrodes 102a and 102b. Since the protrusions 110 are made of the semiconductor layer pattern or the source/drain electrode layer, the protrusions 110 are formed on the gate insulating film 105 and under the passivation film 106.

The second substrate 200 comprises a black matrix layer 201 covering regions except for the pixel regions (these regions correspond to the gate lines and the data lines) and TFT regions, a color filter layer 202 formed on the second substrate 200 including the black matrix layer 201 corresponding to at least the pixel regions, and an overcoat layer 203 formed on the entire surface of the second substrate 200 including the black matrix layer 201 and the color filter layer 202. The column spacers 210 are formed on the overcoat layer 203 corresponding to the upper surfaces of the protrusions 110 formed on the gate lines 101.

Here, the contact holes 108 expose predetermined portions of the drain electrodes 102b from the passivation film 106, and the drain electrodes 102b and the pixel electrodes 103 are electrically connected via the contact holes 108.

In FIG. 7, the surrounding wall of the protrusion is separated by the middle hollow portion. The closed loop-shaped upper surface of the protrusion 110 contacts the upper surface of the column spacer 210. When the protrusion 110 and the column spacer 210 contact with each other, the stress is concentrated on the portion of the column spacer 210 and the portions of the lower layers under the column spacer 210 corresponding to the hollow portion of the protrusion 110, as shown by a dotted circular line. That is, when the portion of the column spacer 210, contacting the protrusion 110, and the corresponding portions of the lower layers are pushed to the circumference of the protrusion 110, the protrusion 110 applies the force to the portion of the column spacer 210 and the portions of the lower layers under the column spacer 210 corresponding to the hollow portion of the protrusion 110. Thus, the stress is concentrated on the portion of the column spacer 210 and the portions of the lower layers under the column spacer 210 corresponding to the hollow portion of the protrusion 110. When the liquid crystal is thermally expanded in a high-temperature environment, the portion of the column spacer 210 and the portions of the lower layers under the column spacer 210, on which the stress is concentrated, provide the elastically restoring force. Accordingly, the column spacer 210 can stably support the first and second substrates 100 and 200 to a predetermined level. That is, when the liquid crystal of the liquid crystal display device of this embodiment is thermally expanded, the column spacer 210 can provide a supporting force in the direction shown by the arrows in FIG. 7. Consequently, the liquid crystal display device of the first embodiment increases a gravity margin, compared to a liquid crystal display device having solid protrusions and column spacers as shown in FIG. 5.

In the liquid crystal display device of the first embodiment, since the protrusion 110 and the column spacer 210 contact with each other at a small area, as shown in FIGS. 6A and 7, a contact area therebetween is small when the first and second substrates 100 and 200 are bonded to each other. Further, when the first or second substrate 100 or 200 is pushed by a force, the shifted substrate 100 or 200 can easily return to its original state due to the smaller friction between the protrusion 110 and the column spacer 210. Therefore, it prevents the occurrence of a touch defect.

Figure 8:
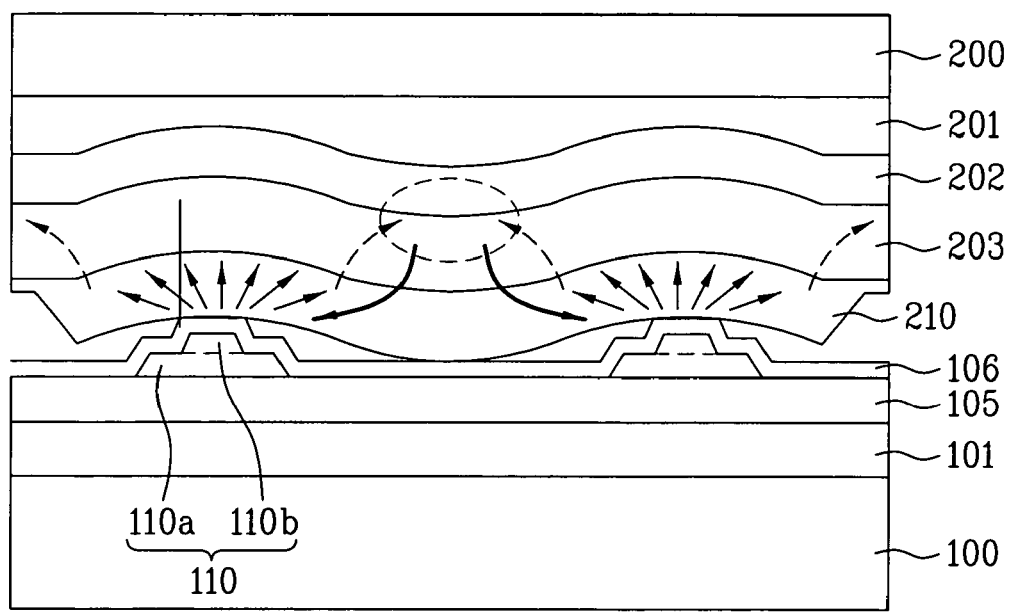
FIG. 8 is a sectional view of a liquid crystal display device in accordance with a second embodiment of the present invention, taken along the line II-II' of FIG. 6A passing through a column spacer and a protrusion.

FIG. 8 is a sectional view of a liquid crystal display device in accordance with a second embodiment, taken along the line II'-II' of FIG. 6A passing through a column spacer and a protrusion. As shown in FIG. 8, the liquid crystal display device of the second embodiment comprises protrusions 110, which are formed by stacking a lower semiconductor layer pattern 110a and an upper source/drain electrode layer 110b. That is, compared to the liquid crystal display device of the first embodiment having the protrusions made of a single layer, since the protrusions 110 of the liquid crystal display device of the second embodiment have a stacked, two-layered structure, the protrusions 110 more strongly press the column spacers 210. Therefore, the stress, which is concentrated on the portion of the column spacer 210 and the portions of the lower layers under the column spacer 210 corresponding to the hollow portion of the protrusion 110, is increased. Accordingly, the stress as shown by a dotted circular line in FIG. 8 is increased. In other words, the elastically restoring force is increased to increase a gravity margin.

Furthermore, like the first embodiment, in the liquid crystal display device of the second embodiment, since the protrusion 110 and the column spacer 210 contact each other at a small area, when the first or second substrate 100 or 200 is pushed by touch, the shifted substrate 100 or 200 can easily return to its original state, thus preventing the occurrence of a touch defect.

Although the embodiments illustrate that the protrusions are formed on the gate lines, the protrusions may also be formed on the data lines or the common lines.

Furthermore, although the column spacers and the protrusions of the illustrated embodiments are applied to an IPS mode liquid crystal display device, the column spacers and the protrusions may be applied to a TN mode liquid crystal display device or other display devices.

In the illustrated embodiment, the passivation film 106 is formed at the top side of the protrusion 110 and covers a top surface the surrounding wall, and the column spacer 210 is in contact with the passivation film. In another embodiment, the passivation film 106 may only cover the other area of the first substrate and expose the protrusion 110 so that the column spacer 210 is in contact with the protrusion 110 directly.

As described above, a liquid crystal display device and method for fabricating the same has the following features.

First, when the protrusions with a hollow portion contact column spacers, the stress is concentrated on the portions of the column spacers and the portions of layers under the column spacers corresponding to the hollow portion of the protrusions. Therefore, a gravity margin, which is as much as the concentration amount of the stress, is assured, thereby allowing the column spacers to stably support the substrates to a predetermined level when liquid crystal is expanded due to the heat. Accordingly, the elastically restoring force of the portions of the column spacers corresponding to the closed loop-shaped upper surfaces the protrusions is provided to prevent the occurrence of a gravity defect.

Second, since the protrusions having a smaller upper surface area than that of the column spacers, when one substrate is shifted by a force, the shifted substrate can easily return to its original state due to the decrease of friction between the protrusions and the column spacers, thereby preventing the occurrence of a touch defect.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device, comprising:
 a first substrate and a second substrate facing each other;
 a gate line and a data line crossing each other to define a pixel region on the first substrate;
 a thin film transistor on the first substrate and adjacent to the pixel region;
 a column spacer located on the second substrate;
 a protrusion located on the first substrate at a location corresponding to the column spacer, the protrusion having a hollow portion and a surrounding wall surrounding the hollow portion, the hollow portion being exposed at the top side of the protrusion; and
 a liquid crystal layer interposed between the first substrate and the second substrate,
 wherein the surrounding wall of the protrusion includes a stacked structure, the stacked structure including a base layer and a top layer stacked on the base layer, the base layer being wider than the top layer.

2. The liquid crystal display device of claim 1, wherein the column spacer is in contact with the protrusion at the top side of the protrusion.

3. The liquid crystal display device of claim 2, wherein die protrusion includes a passivation film at the top side of the protrusion and covering a top surface the surrounding wall, the column spacer being in contact with the passivation film.

4. The liquid crystal display device of claim 1, wherein a portion of the column spacer enters into the hollow portion of die protrusion.

5. The liquid crystal display device of claim 1, wherein the column spacer has a surface facing the top side of die protrusion, and the surface of the column spacer is larger than an area surrounded by an outer circumference of the top side of the protrusion.

6. The liquid crystal display device of claim 1, wherein the thin film transistor includes a gate electrode, a source electrode, a drain electrode, and a semiconductor layer on the gate electrode.

7. The liquid crystal display device of claim 1, wherein the base layer and the top layer are made of different materials.

8. The liquid crystal display device of claim 6, wherein the base layer is made of a same material as the semiconductor layer, and the top layer is made of another same material as the source electrode or the drain electrode.

9. The liquid crystal display device of claim 6, wherein the base layer is located on a same layer as the semiconductor layer, and the top layer is located on another same layer as the source electrode or the drain electrode.

10. The liquid crystal display device of claim 1, wherein the hollow portion at the top side of the protrusion has one of a circular shape and a polygonal shape.

11. The liquid crystal display device of claim 1, wherein the protrusion is located on one of the gate line, the data line or a common line on the first substrate.

12. A method for fabricating a liquid crystal display device, comprising:
 providing a first substrate and a second substrate;
 forming a gate line and a data line on the first substrate crossing each other to define a pixel region;
 forming a thin film transistor on the first substrate and adjacent to the pixel region;
 forming a column spacer located on the second substrate;
 forming a protrusion on the first substrate at a location corresponding to the column spacer by forming a surrounding wall surrounding a hollow portion and exposing the hollow portion at the top side of the protrusion;
 forming a liquid crystal layer between the first substrate and the second substrate; and
 bonding the first substrate and the second substrate to face each other,
 wherein the step of forming the surrounding wall of the protrusion includes forming a stacked structure by forming a base layer and a top layer stacked on the base layer, the base layer being wider than the top layer.

13. The method of claim 12, wherein the bonding step includes contacting the column spacer with the top side of the protrusion.

14. The method of claim 13, wherein the step of forming the protrusion further includes forming a passivation film at the top side of the protrusion to cover a top surface of the surrounding wall, and the step of contacting the column spacer with the protrusion includes contacting the column spacer with the passivation film.

15. The method of claim 12, wherein the bonding step includes pushing a portion of the column spacer into the hollow portion of the protrusion.

16. The method of claim 12, wherein the step of forming the column spacer includes forming a surface of the column spacer facing the top side of the protrusion to be larger than an area surrounded by an outer circumference of the top side of the protrusion.

17. The method of claim 12, wherein the step of forming the thin film transistor includes forming a gate electrode, a source electrode, a drain electrode, and a semiconductor layer on the gate electrode.

18. The method of claim 12, wherein the base layer and the top layer are formed of different materials.

19. The method of claim 17, wherein the step of forming the base layer includes forming the base layer using a same material as the semiconductor layer, and the step of forming the top layer includes forming the top layer using another same material as the source electrode or the drain electrode.

20. The method of claim 17, wherein the step of forming the base layer includes forming the base layer on a same layer as the semiconductor layer, and the step of forming the top layer includes forming the top layer on another same layer as the source electrode or the drain electrode.

21. The method of claim 12, wherein the step of forming the protrusion includes exposing the hollow portion, wherein the hollow portion has one of a circular shape and a polygonal shape.

22. The method of claim 12, wherein the step of forming the protrusion includes forming the protrusion on one of the gate line, the data line or a common line on the first substrate.

* * * * *